US008463686B2

(12) United States Patent
Turner

(10) Patent No.: US 8,463,686 B2
(45) Date of Patent: *Jun. 11, 2013

(54) SYSTEM FOR REAL TIME CONTINUOUS DATA PROCESSING FOR INVESTMENT PORTFOLIOS

(76) Inventor: Walter Anthony Turner, Greenwich, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/854,748

(22) Filed: Aug. 11, 2010

(65) Prior Publication Data

US 2011/0087617 A1    Apr. 14, 2011

Related U.S. Application Data

(62) Division of application No. 09/906,157, filed on Jul. 16, 2001.

(60) Provisional application No. 60/218,450, filed on Jul. 14, 2000.

(51) Int. Cl.
*G06Q 40/00* (2006.01)
(52) U.S. Cl.
USPC ............... 705/36 R; 705/35; 705/37; 705/38
(58) Field of Classification Search
USPC ............................... 705/35, 36, 37, 36 R, 38
See application file for complete search history.

(56) References Cited

U.S. PATENT DOCUMENTS

| | | | |
|---|---|---|---|
| 6,021,397 A * | 2/2000 | Jones et al. | 705/36 R |
| 6,317,728 B1 | 11/2001 | Kane | |
| 6,484,151 B1 | 11/2002 | O'Shaughnessy | |
| 6,601,044 B1 * | 7/2003 | Wallman | 705/36 R |
| 6,820,069 B1 | 11/2004 | Kogan et al. | |
| 7,016,870 B1 | 3/2006 | Jones et al. | |
| 7,165,044 B1 | 1/2007 | Chaffee | |

OTHER PUBLICATIONS

Turner, W. A., U.S. Office Action mailed Mar. 9, 2007, directed to U.S. Appl. No. 09/906,157; 5 pages.
Turner, W. A., U.S. Office Action mailed Nov. 28, 2007, directed to U.S. Appl. No. 09/906,157; 9 pages.
Turner, W. A., U.S. Office Action mailed Aug. 20, 2008, directed to U.S. Appl. No. 09/906,157; 9 pages.
Turner, W. A., U.S. Office Action mailed Apr. 10, 2009, directed to U.S. Appl. No. 09/906,157; 10 pages.
Turner, W. A., U.S. Office Action mailed Jul. 28, 2010, directed to U.S. Appl. No. 09/906,157; 9 pages.
Turner, W. A., U.S. Office Action mailed Dec. 22, 2011, directed to U.S. Appl. No. 09/906,157; 12 pages.
Turner, U.S. Office Action mailed Sep. 4, 2012, directed to U.S. Appl. No. 09/906,157; 12 pages.

* cited by examiner

*Primary Examiner* — Nga B. Nguyen
(74) *Attorney, Agent, or Firm* — Morrison & Foerster LLP

(57) ABSTRACT

A real time continuous data inputting, processing, scanning and displaying system for financial data and inputting variable boundaries of data for a variety of desired data characteristics. The process displays when the data characteristics fall outside their respective variable boundaries. Real time financial markets data and conventional data inputs are input into the system which is comprised of conventional and new computer processor enabled processes, clusters of central processing units, a report writer, terminal device, data disk, and interface. The data disks and real time financial market data and conventional data inputs and outputs are continuously referenced during the scanning process for exceptions to the boundaries of desired data characteristics.

24 Claims, 16 Drawing Sheets

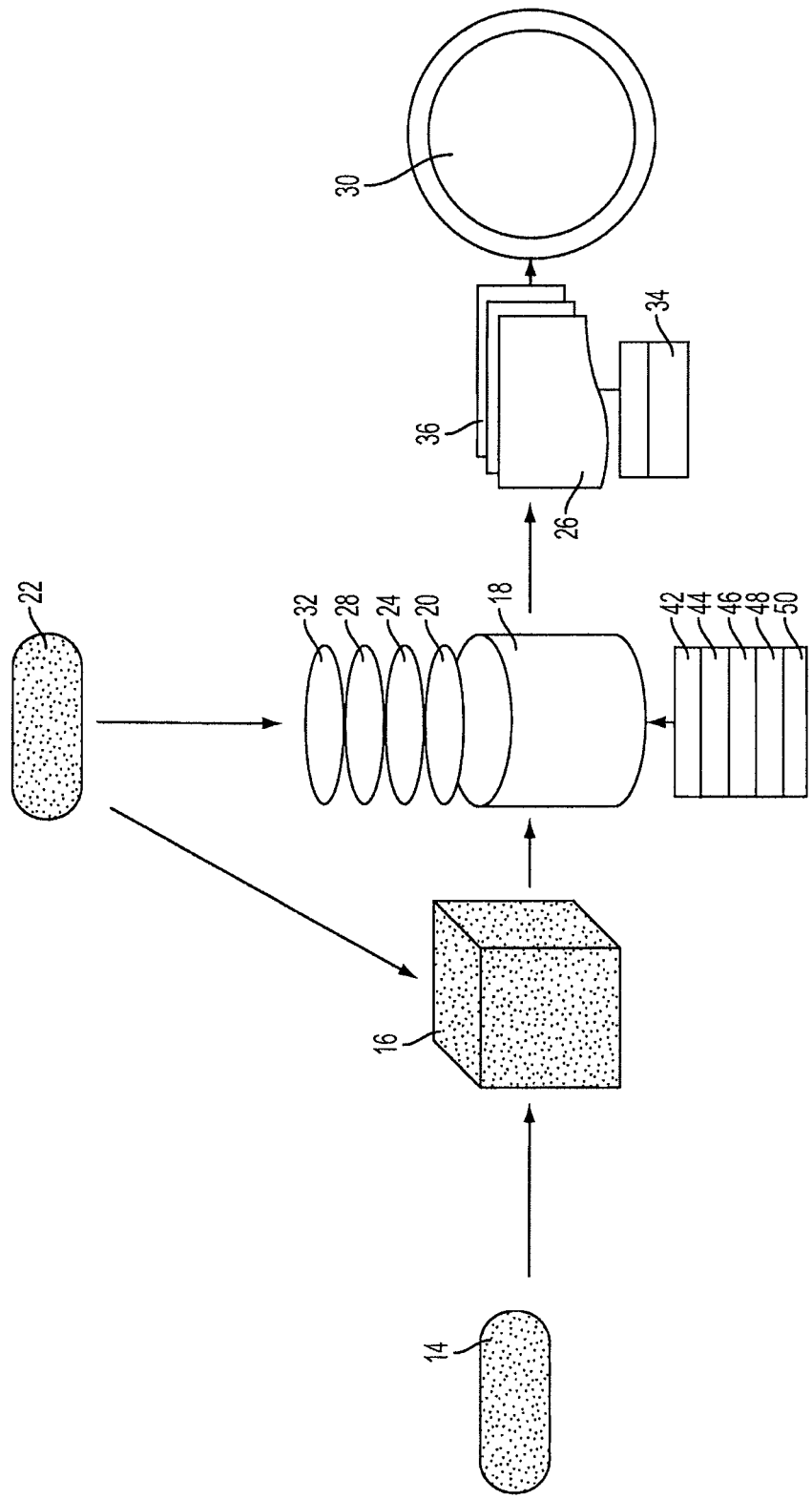

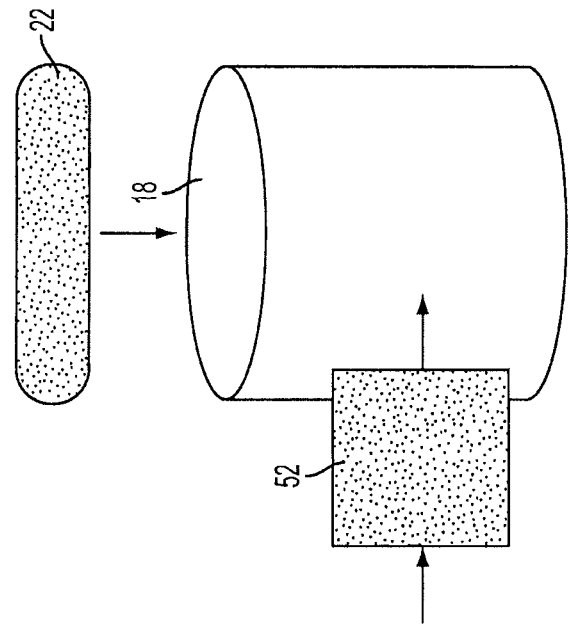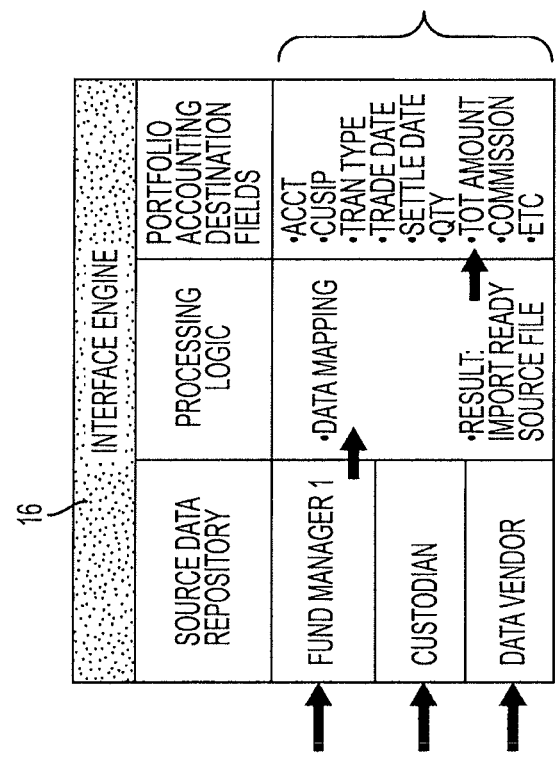
FIG. 1C

SYSTEM FOR REAL TIME CONTINUOUS DATA PROCESSING FOR INVESTMENT PORTFOLIOS

CROSS-REFERENCE TO RELATED APPLICATION

This application is a divisional application of U.S. patent application Ser. No. 09/906,157, filed Jul. 16, 2001 which claims the benefit of Provisional Patent Application No. 60/218,450, filed Jul. 14, 2000, the entire contents of which are hereby incorporated by reference.

BACKGROUND

1. Field of Invention

This invention relates to real time continuous data processing for investment portfolios and continuously displaying data and exceptions to predetermined portfolio guidelines.

This invention further relates to computer processor enabled system for continuous real time data receiving, processing, analyzing, counting and scanning of the results of analyses and characteristics of investment portfolios, investment accounts, and securities, against predetermined data boundaries and displaying when exceptions to the boundaries occur.

2. Description of Prior Art

Financial services companies, investors and their suppliers commonly use a process that is manually initiated to periodically analyze and monitor characteristics of portfolios on a post performance, ad hoc basis with primarily arbitrary outcomes. In addition, measuring consists primarily of investment performance and risk calculations while additional information, vital to assessing trends in portfolio additions and deletions and their impact on the portfolio, are not considered. Portfolio analyses are conducted and reviewed on a random basis, manually initiated, generally monthly or quarterly, well after the fact and not while the portfolio is being built and managed.

Given this, investment managers, be they self directed, outsourced or provided internally by a company, basically "work in the dark" with investors not being aware of errors and mistakes until long after the fact and too late to take action. Further, continuous awareness and analysis of impact of fluctuations in world financial markets are not enjoyed by practitioners.

The current methodology presents still further problems for investors and investment managers alike. These problems include poor quality and reliability of results of portfolio and account analyses, lack of timely notification when investors get off track in meeting investment goals, when and how portfolio characteristics are changing against boundaries, when an investment manager deviates from their decision making model or investment philosophy, when to replace a manager or make changes in the portfolio composition before it is too late and minimize losses, and when and how to fine-tune the portfolio or investment process or both.

SUMMARY

Accordingly, several objects and advantages of my system are that they automate portfolio analysis to continuous providing for consistent, high quality and most reliable outcomes and results. The system to use more information more often and therefore output vital information to assess trends in the impact of portfolio additions and subtractions and price activities or fluctuations in world financial markets, or both, on the portfolio.

The system to provide for processing data automatically and continuously as the portfolio is being managed and displaying when an exception occurs in the portfolio, against predetermined boundaries. This to provide for immediate realization of mistakes or errors made by portfolio managers, allowing investors to be the first to know when they get off track in meeting financial goals and objectives or when a manager deviates from their decision making process or investment philosophy.

My system to provide for when and how to make changes in the portfolio and fine-tune the process before it is too late to minimize losses and minimizing overall investment mistakes against predetermined boundaries.

Other objects and advantages are to provide for more efficient and effective economical business and operating models by those that build, maintain and monitor portfolios or retain or replace third party managers, or any combination; to benefit a very large market consisting of investors worldwide; to satisfy a tremendous psychological and economic need of all investors to be in the know immediately when their portfolio falls outside of predetermined; to provide for labor, time and cost savings of the users; to provide for a more convenient and easier to use system for portfolio and continuous scanning and displaying; and to provide for automation of a manual process.

Additional objects and advantages of the system is the ability to provide for acceleration of process to continuous; to provide for reliability, precision, attentiveness and thoroughness in the investment management process; to provide for minimization of errors in investment management; to provide for compatibility with existing data sources and analytical tools; to provide for no inertia to be overcome for use; to provide for ease of promotion and grasp of benefit; to provide for use in an existing market benefiting mankind; to provide an enhancement to the trust between investors and portfolio managers; to provide for the acceleration of the rebalancing decision; and to provide for acceleration of the reallocation decision.

Still, further objects and advantages are to provide for acceleration of short fall risk (ahead or behind in goals); to provide for leveraging good investment decisions if within boundaries; to provide for relief of the arduous and daunting task of monitoring and analyzing investment portfolios; to provide for more cost effective distribution for investment managers; to provide for ongoing validity of the composition and structure of a client's total portfolio; to provide for more and more timely and high quality communications between investors and managers; to provide for determination if investment policy is realistic against actual performance over the long term; to provide for objective, consistently applied approach to manager and evaluation; to provide for tracking error minimization; to provide for better tax efficiency; to provide for motivation to managers to think profoundly about portfolio return on an investor basis; to provide for higher probability of achieving desired returns, goals and objectives; to provide for immediate awareness of changes in decision making process and investment philosophy.

Finally, still further objects and advantages of my invention will become apparent from a consideration of the drawings and ensuing description.

DESCRIPTION OF DRAWINGS

In the drawings, related Figs. have the same number but different alphabetic suffixes.

FIGS. 1A to 1D shows various components of the system.

Figure 1B:
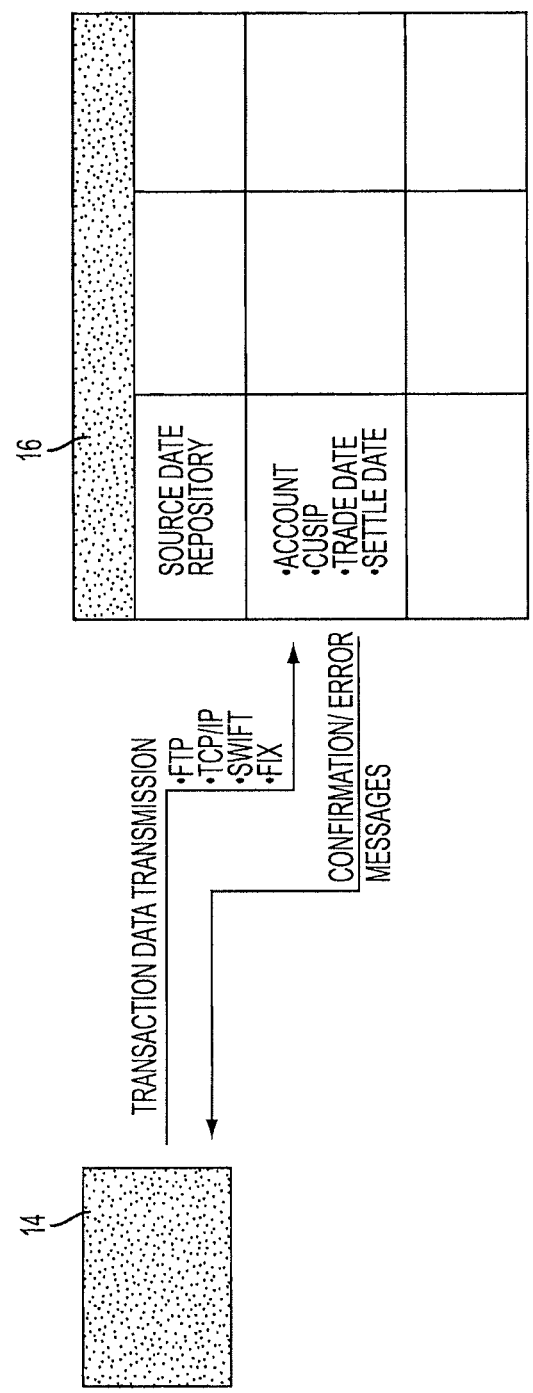
Figure 1D:
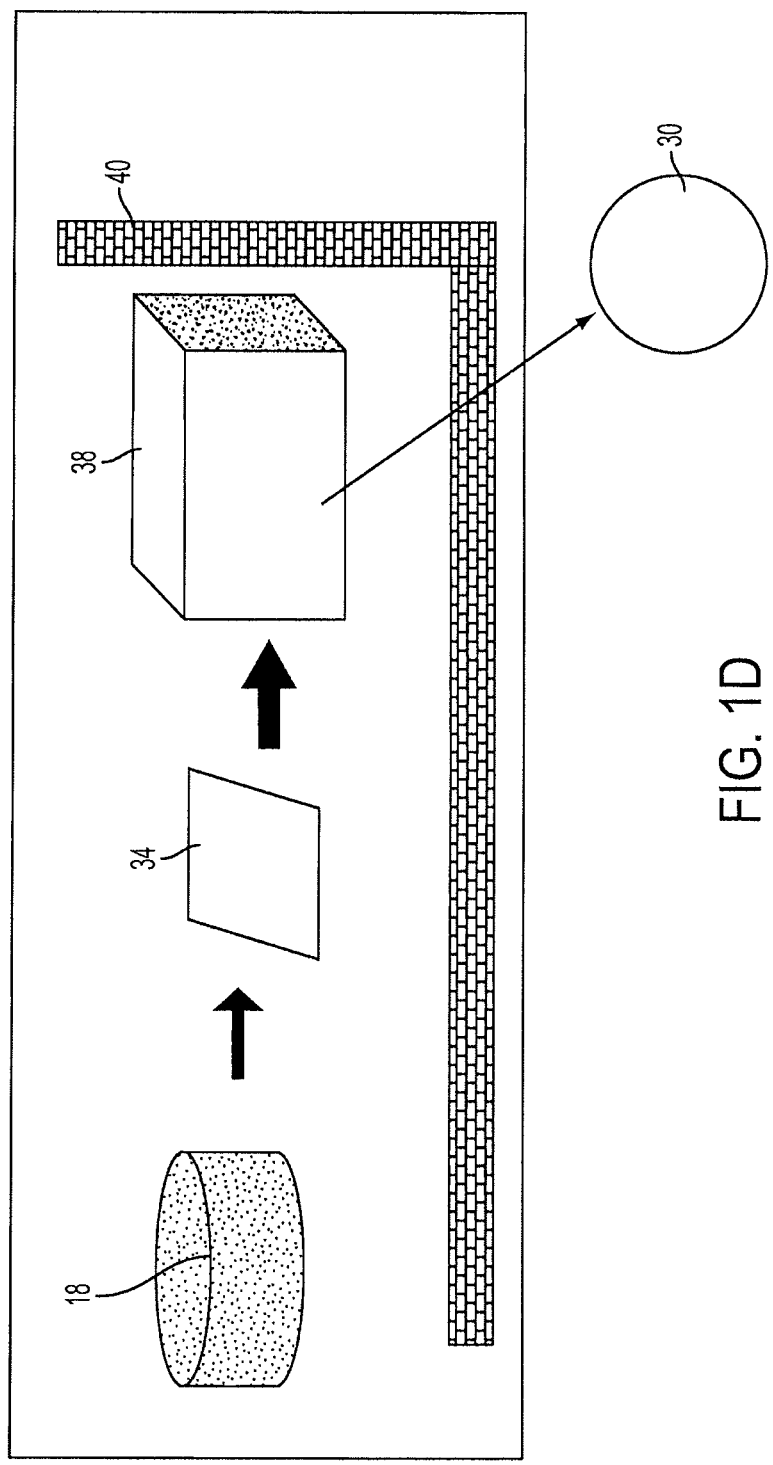

LIST OF REFERENCE NUMERALS 14 continuous data inputs
16 interface
18 Central Processing Unit
20 data disk
22 pricing and security attribute inputs
24 process that controls and directs the apparatus for processing
26 exceptions reporting via the World Wide Web
28 process to access data on data disk
30 World Wide Web
32 process for computerized apparatus to store process results
34 report writer
36 device to continuously display exceptions results
38 World Wide Web application server
40 security firewall for the website
42 conventional portfolio accounting process
44 reporting process
46 conventional performance attribution process
48 conventional risk analysis process
50 continuous scanning for Exceptions and displaying exceptions process in C++
52 batch import process

DETAILED DESCRIPTION OF THE DRAWINGS

A preferred embodiment is illustrated in FIGS. 1A-1D, 3. The system has continuous data inputs 14 from multiple sources. These sources include investment managers, custodians of securities, transfer agents, real time financial markets data, and vendors of data, or any combination. These inputs consist of desired data characteristics of the portfolio, boundaries for each of the desired data characteristics of the portfolio, security data, portfolio data, trade data, position data, quantity data, account data, all validated and reconciled, and are connected to an apparatus for continuous processing via interface process 16 via a transmission of data in a batch import process 52.

Interface 16 provides automated data retrieval, validation, and correct and timely import format into conventional portfolio accounting process 42. Interface 16 consists of code logic, test logic, inputs data repository, processing logic, and data destination fields. A pricing and financial markets and securities data input 22 is used to continuously update prices and data to the system and is connected to transmit data. The portfolio accounting process 42 continuously process additions and deletions and price changes, and calculates investment performance data.

Multiple dedicated central processing units 18 with enough data disk 20 and enough memory and processing capacity and capability are used to enable the continuous process. These processes include a process for controlling and directing the units for processing 24, a method to access data 28 on disk 20, and a continuous reporting process 44 which configures the data output for reporting purposes. Further, additional processes include a conventional performance attribution process 46 which continuously processes data and calculates the sources of performance from asset allocation, security selection, market timing, and interaction among these and enabled by unit 18, a conventional risk analysis process 48 for continuously processing data and calculating risk and enabled by unit 18, and a "rules" or exceptions process 50 for processing and scanning characteristics of the portfolio, and displaying exceptions to predetermined data boundaries and enabled by unit 18.

A storing process 32 is used for units 18 to store this output. This output is received by the data disk 20 and displayed by device for display 36. Data 26 is the resulting exceptions to boundaries data. A World Wide Web or Internet is 30. A report writer 34 is used to translate accounting, performance attribution, risk, and exception data from text file or table format to HTML format. Also needed is a World Wide Web application server 38 and World Wide Web security firewall 40.

Figure 2:
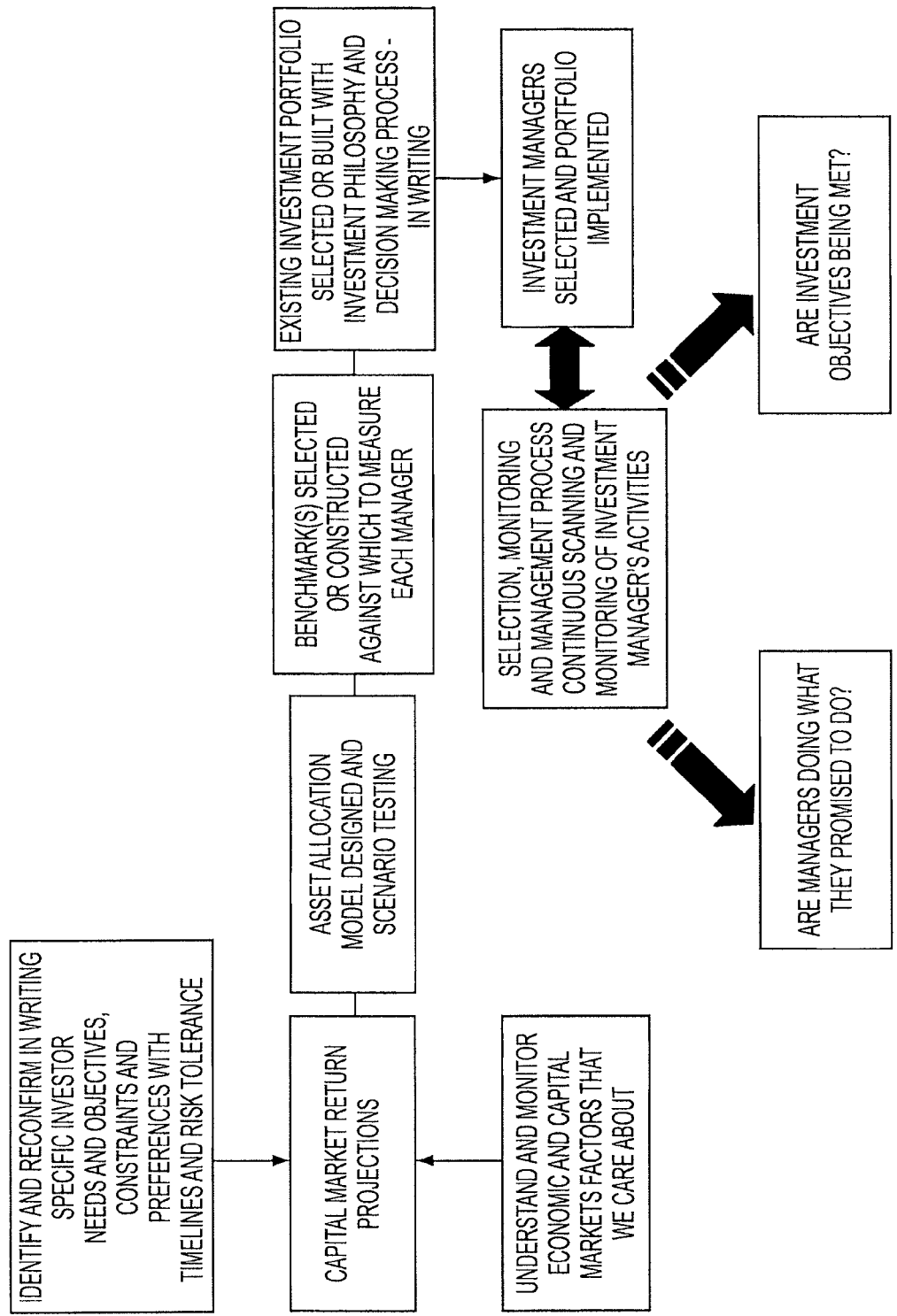
FIG. 2 shows the revolving cycle of data and information flow.

FIG. 2 illustrates the establishment and revolving cycle of data flow used for initial data input and resulting data output.

Figure 3A:
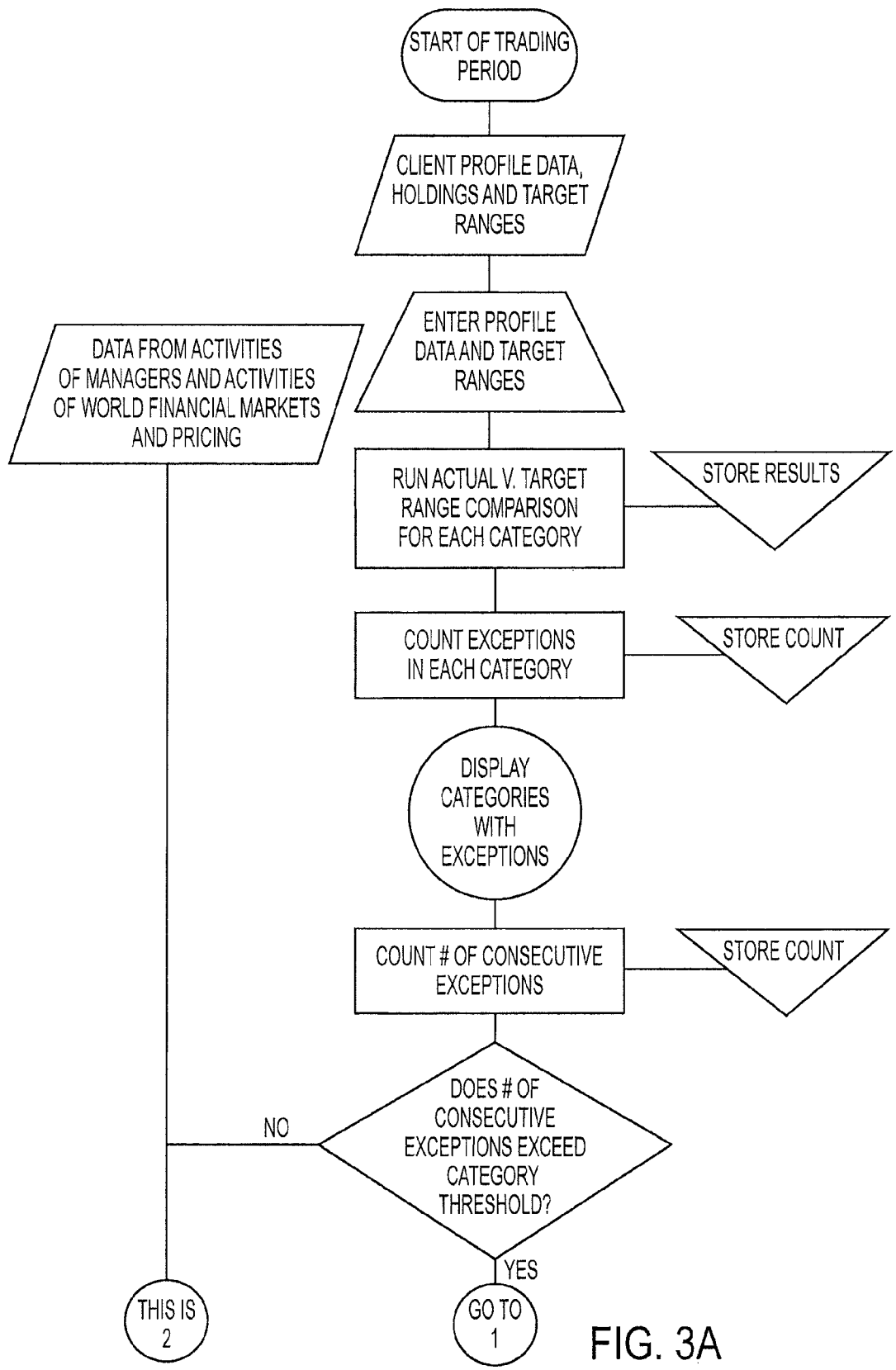
FIG. 3 shows the flowchart of the process for inputting, identifying, counting, and displaying exceptions to predetermined data boundaries (i.e. the exceptions process).
Figure 3B:
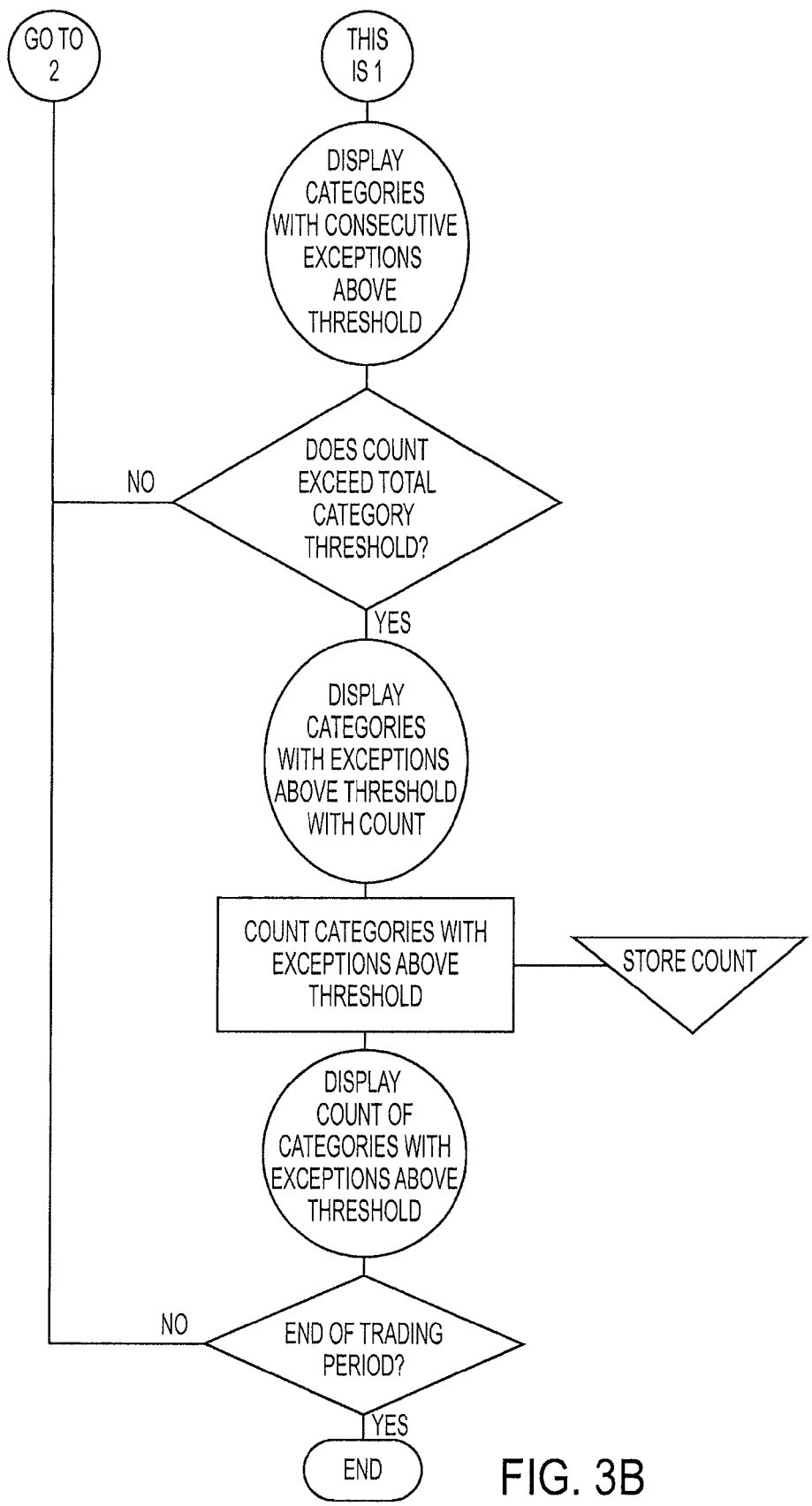

FIG. 3 illustrates the process 50 flowchart for continuously processing, scanning, identifying, and counting exceptions to boundaries and continuously displaying the exceptions to the boundaries. This processing method is continuous and enabled by units 18.

OPERATION OF THE SYSTEM OF FIGS. 1A-1D AND 3

Predetermined desired characteristics of portfolios and their respective target ranges or boundaries, all based on portfolio guidelines, in the form of data for the investment securities, accounts, and portfolios are entered into the data boundaries process 50. These boundaries are based on the objectives and goals of the investor. Specifically, they include, but are not limited, to a) Short term gains and losses
b) Long term gains and losses
c) Limitation on any special groupings
d) Tracking error
e) Risk
f) Portfolio turnover
g) Investment philosophy of the investment manager or investor if self directed (characteristics may include but not be limited to market cap, growth and profitability measures, valuation ratios, economic sector weightings, earnings and price volatility statistics)
h) Decision making model of the investment manager or investor if self directed (characteristics may include but not be limited to market cap, growth and profitability measures, valuation ratios, economic sector weightings, earnings and price volatility statistics, dividend yield, projections, revenues, roe, etc.)

i) Cash positions
j) Performance attribution
k) Changes in sources of return or loss
l) Number of exceptions allowed by desired characteristic and overall
m) Tracking error v. comparable capital market styles and sub-styles
n) Age of each issue entering the portfolio (new issue or existing)
o) Number of positions
p) U.S. or applicable state tax regulations or both
q) Asset allocation
r) Portfolio return Next, my system receives data inputs 14 from the investor's investment managers, custodians of securities, transfer agents, and vendors of data, or any combination, via batch import process 52. These data inputs consist of real time financial markets data security data, portfolio data, trade data, position data, quantity data, account data, all validated and reconciled, upon confirmation, and are connected via interface 16.

Next, the interface 16 provides automated data retrieval, validation, and correct and timely import format into the conventional portfolio accounting process 42. The interface 16 consists of code logic, test logic, inputs data repository, processing logic, and data destination fields. The process 42 then processes data for additions and deletions in an account or portfolio or both, and therefore calculates investment performance.

Multiple dedicated central processing units 18 with enough memory and processing capacity and capability to enable the continuous performance of the process 42 are used. Conventional processes include a reporting process 44 which configures the data output for reporting purposes and a conventional performance attribution process 46 which calculates the sources of performance between asset allocation, security selection, market timing, and interaction among these. Further, a conventional risk analysis process 48 for calculating risk, and a "rules" or exceptions process 50 for continuous processing and scanning characteristics of the portfolio and counting and displaying exceptions to predetermined data boundaries and counting and displaying exceptions to exceptions of exceptions of boundaries as shown in FIG. 3.

The process 42 is performed first using the output from interface 16 and a pricing and data inputs 22. Next, the risk analysis process 48 is performed using the output from the interface 16 and the process 42. Next, the process 46 is performed, using the output from the interface 16, process 48, and process 42. Next, a collective data from all these processes are received by the central processing units 18. Next, process 50 is performed scanning the output from the interface 16, process 48, process 46, and process 42 to find and display exceptions to the predetermined boundaries.

FIG. 3 Process 50 with Examples of Portfolio Characteristics:

First for performance v. the benchmark, conventional portfolio performance is calculated and compared to benchmark performance and displayed and stored; the difference in this amount, known as the tracking error, is displayed and stored. Amount of portfolio performance that is above or below benchmark performance=tracking error. If this comparison results in a tracking error outside the predetermined data boundaries, this is an exception and the process displays the result (the tracking error) and the result is stored.

Second for changes in sectors or any special groupings, each addition or deletion or both to the portfolio is categorized by economic sector or special grouping(s), or both, and its market value obtained from a third party data inputs and added to the existing values of issues in the same sector or special grouping(s) for a total value and displayed and stored. This total value is then compared to the value before the additions or deletions or both. An exception is created if this value is not within the predetermined boundaries. If the total value is an exception, the program displays the result and the result is stored.

Third for tax efficiency as the gain or loss is calculated and determined to be a short term or long-term gain or loss per U.S. or applicable state tax regulations or both. Exceptions are created and reported and stored if the amount(s) previously described and calculated upon each additions or deletions or both do not equal the amount previous to the additions or deletions or both and outside the predetermined boundaries, and if so, are reported and stored.

Fourth for top sources of return or loss given that after each addition or deletion or both, a performance attribution analyses is performed including but not limited to allocation, selection, interaction, and active management for any special groupings or single issues or both. Each of these areas is displayed and stored for the top five sources of return or losses for each (allocation, selection, etc.) and for the portfolio overall with respective data boundaries for each.

Fifth for changes in sources of return or loss given that after each addition or deletions or both, a performance attribution analyses is performed including but not limited to allocation, selection, interaction, and active management for any special groupings or single issues or both. Each of these areas is displayed and stored for the top five sources of return or losses for each (allocation, selection, etc.). Next, the results in each desired characteristic are compared to the values, groupings, etc after the previous analyses. Exceptions are created and reported and stored if the amount(s) previously described and calculated upon each additions or deletions or both do not equal the amount previous to the additions or deletions or both and outside the predetermined boundaries, and if so, are reported and stored.

Sixth for Risk as it is conventionally calculated and compared to the risk prior to the additions or deletions or both and displayed and stored; the difference in this amount is displayed and stored. If the additions or deletions or both in the portfolio results in an increase or decrease in risk and outside the predetermined boundaries, the program displays the exception and reports it and is displayed and stored.

Seventh for changes in cash positions as cash amount is compared to amount previous to the additions or deletions or both and displayed and stored. If the additions or deletions or both in the portfolio results in an amount not equal to the predetermined amount and within the boundaries, the program displays the exception and reports it by amount and displayed and stored.

Eighth for investment philosophy and decision making model as each component of the investment philosophy or decision making model or both is compared to the boundaries; if an exception is created if the characteristics of the existing securities, additions or deletions or both are outside the predetermined boundaries, it is reported, displayed and stored.

Ninth for the number of exceptions created as the number of times an exception is created for each characteristic and the number of consecutive exceptions for each characteristic are counted and if outside predetermined boundaries, are displayed and stored.

Tenth for portfolio turnover as portfolio turnover annualized is conventionally calculated and compared to the amount of target turnover annualized previous to the additions or deletions or both and displayed and stored. If the additions or deletions or both results in an annualized amount not equal to the portfolio target amount annualized and outside the predetermined boundaries, an exception is displayed and stored.

Eleventh for number of positions as a count is made of the number of positions in the portfolio upon the additions or deletions or both and compared to the predetermined boundaries of positions and displayed and stored. If the number of positions does not equal the number prior to the additions or deletions or both and outside the predetermined boundaries, the program displays the exception and reports it by amount and displayed and stored.

Twelfth for portfolio return in that performance annualized is conventionally calculated and compared to the target range return and displayed and stored. If the performance of the portfolio does not equal the target performance, the program displays the exception and reports it by amount and displayed and stored. This step also includes full portfolio attribution including allocation, selection, interaction, and active management.

Thirteenth for asset allocation given that after each addition or deletion, or both, asset allocation is refigured by the third party system and reported and stored. This total value and value for each asset class and style and substyle and cash is then compared to the value(s) before the additions or deletions or both. An exception is created if this value is not equal to the prior value before the additions or deletions or both and outside the predetermined boundaries. If the total value is an exception, the program displays the result and the result is stored.

Fourteenth for new issues given that after each addition or deletion, or both, is identified as to whether or not it is a new or existing issue. If it is a new issue, the program signals this and stores the signal (results) and reports that a new issue has entered the portfolio. This signal is added to previous signals in order for a running count to be kept of the number of issues that entered the portfolio(s) when they were new.

This output is received by and stored in the data warehouse 18. Data 26 is the resulting exceptions data to boundaries data and a result of process 50. FIG. 3 process 50 refers to additions or subtractions, or both, in the portfolio and pricing data on financial markets and continuously identifies exceptions to the previously determined boundaries of data characteristics (category). Further, it stores the results, displays results, counts the number of consecutive exceptions to each boundary and stores the results; if the number of consecutive exceptions does not exceed the predetermined exceptions to exceptions threshold, then the process is repeated; if the number of consecutive exceptions does exceed the predetermined exceptions to exceptions threshold, then the results are displayed by data characteristics or category; if the number of consecutive exceptions to predetermined exceptions to exceptions boundaries exceeds the threshold count, the characteristics are displayed, the process then counts the number of characteristics outside the exceptions to exceptions and stores the results and displays the number of characteristics in which exceptions to exceptions have been exceeded; the process is repeated unless financial markets close.

The report writer 34 is used to translate final accounting, performance attribution, risk, and exception data from text file or table format from the data disk 20 to HTML format. This HTML format data is then processed by the World Wide Web service application 38 and available through the World Wide Web firewall 40. The data can be obtained upon receiving a signal via the World Wide Web when an exception to predetermined boundaries occurs. The process, beginning with "The portfolio accounting process 42 is run first", is real time continuous.

FIGS. 4-12—ADDITIONAL EMBODIMENTS

Figure 4:
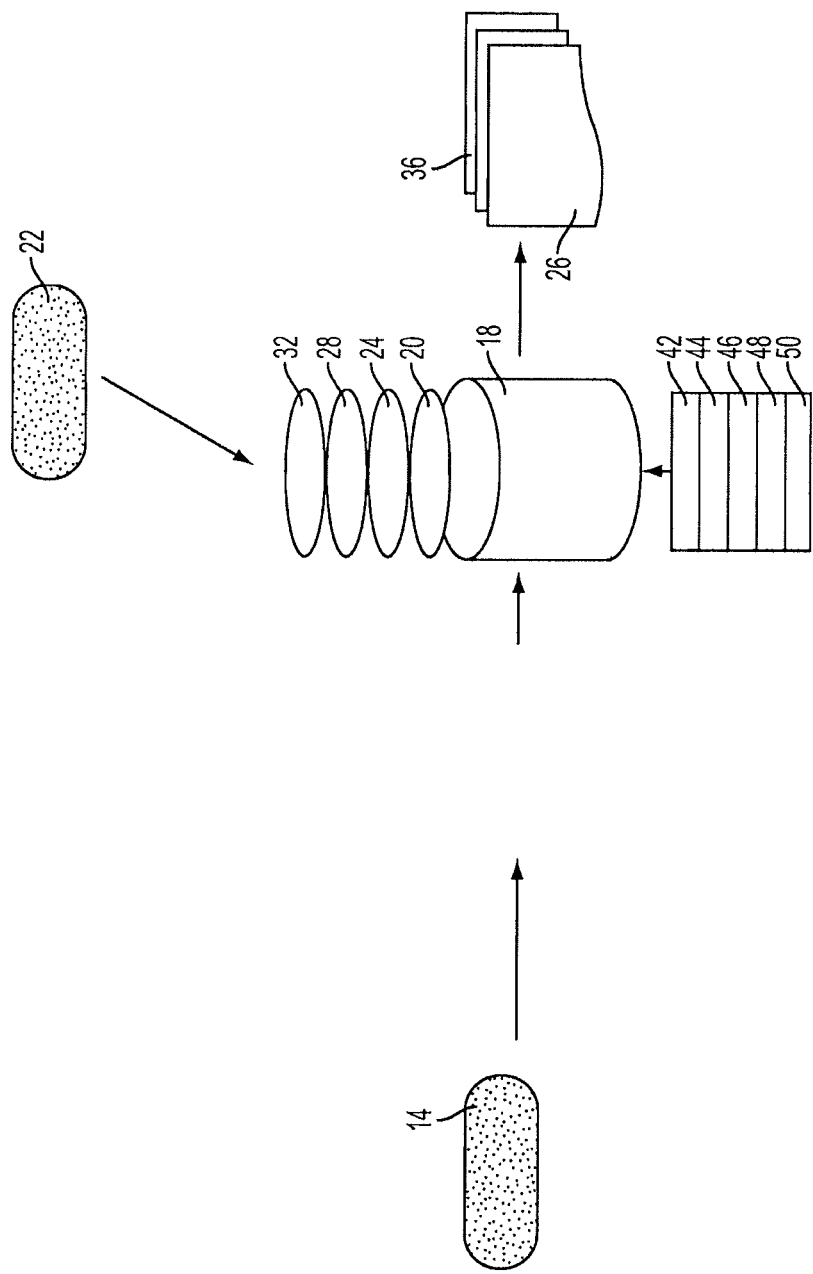
FIG. 4 shows the system for investment portfolios and is manual.
Figure 5:
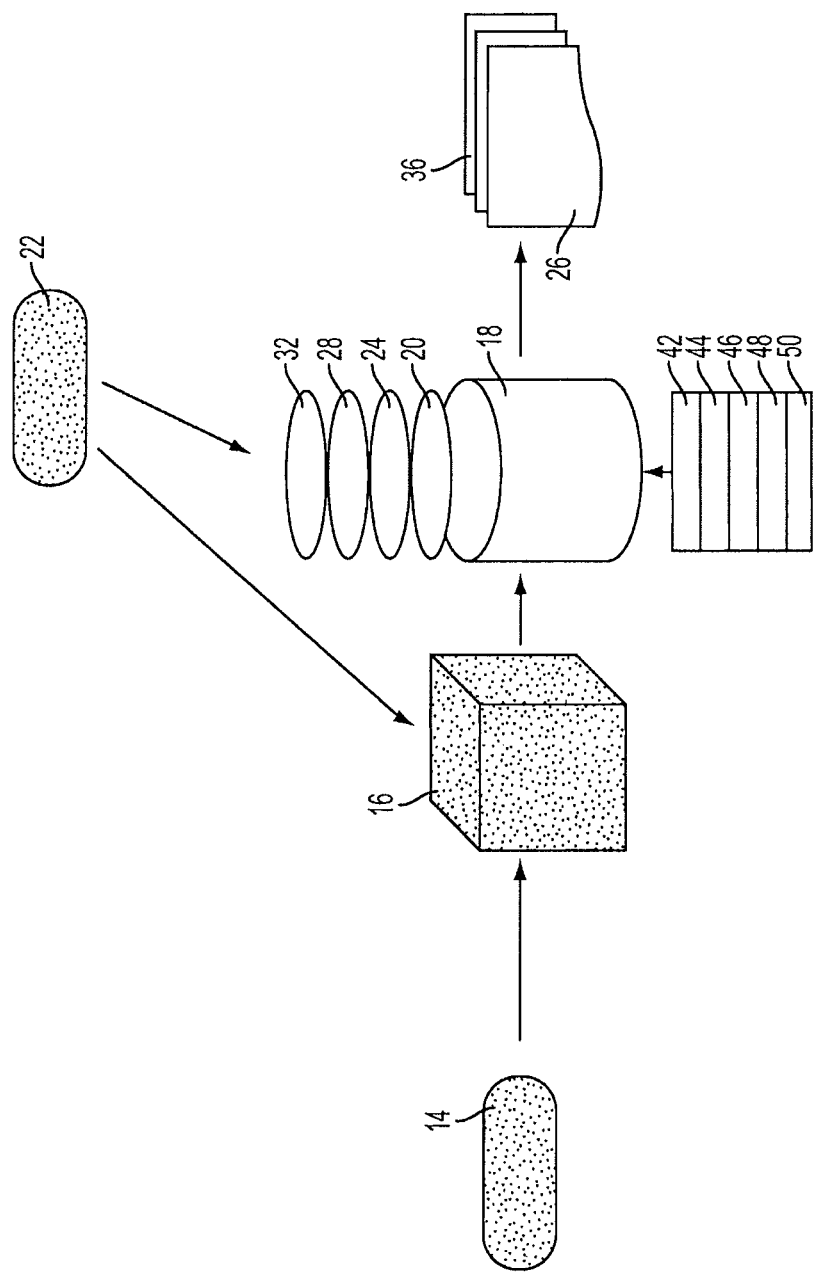
FIG. 5 shows the system for investment portfolios, is manual and includes an interface.
Figure 6:
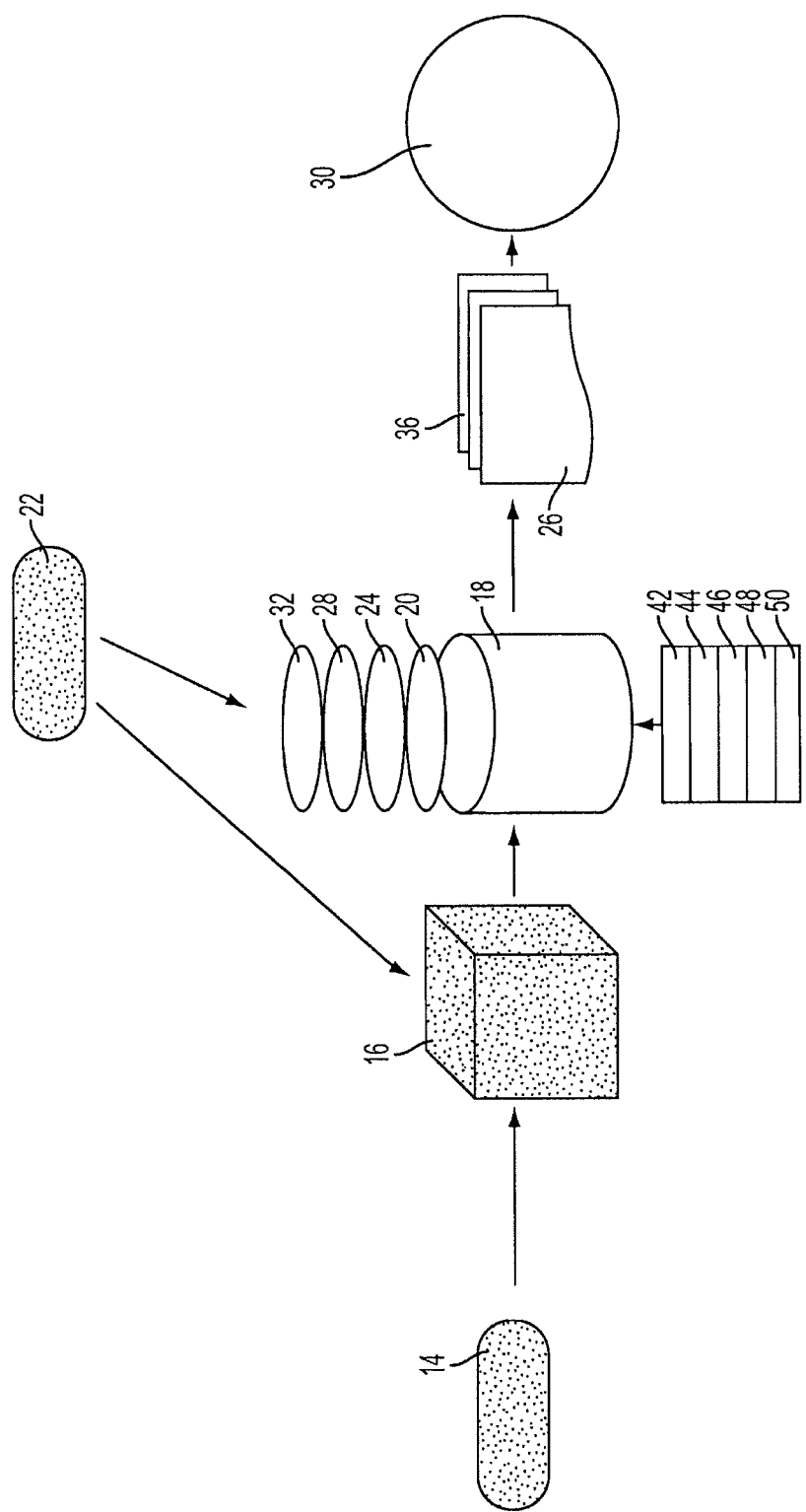
FIG. 6 shows the system for investment portfolios, is manual and includes an interface and World Wide Web.
Figure 7:
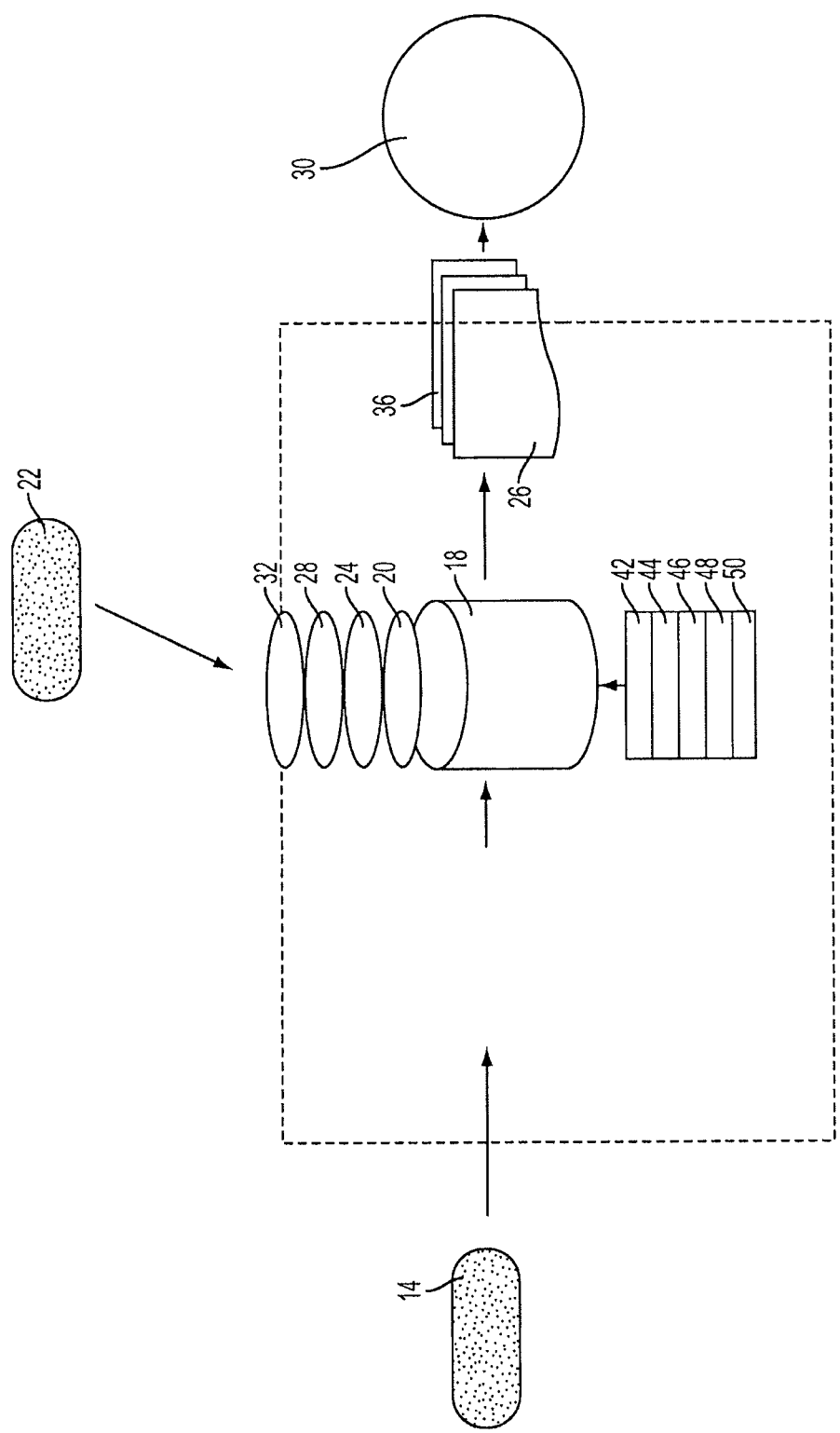
FIG. 7 shows the system for investment portfolios, is manual and includes the World Wide Web.
Figure 8:
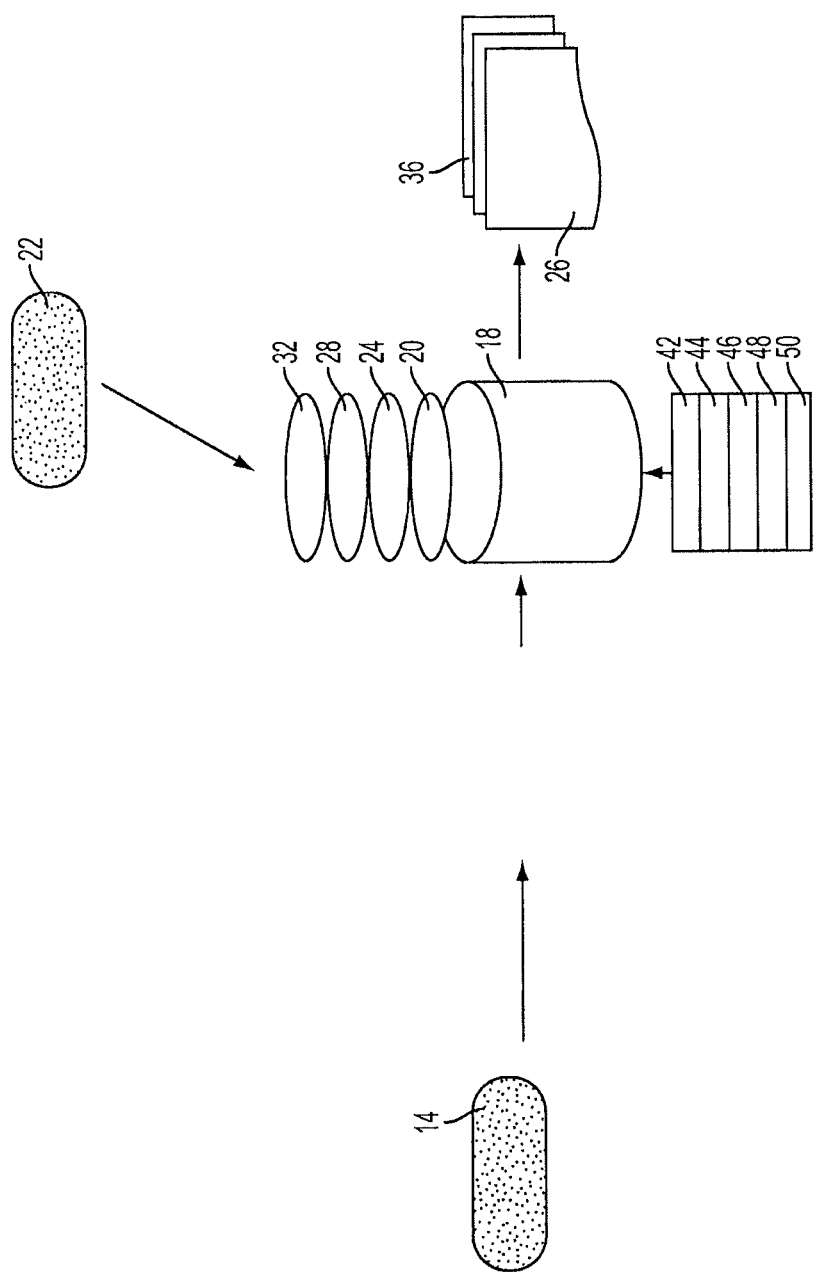
FIG. 8 shows the real time continuous system which is applied to any data input.
Figure 9:
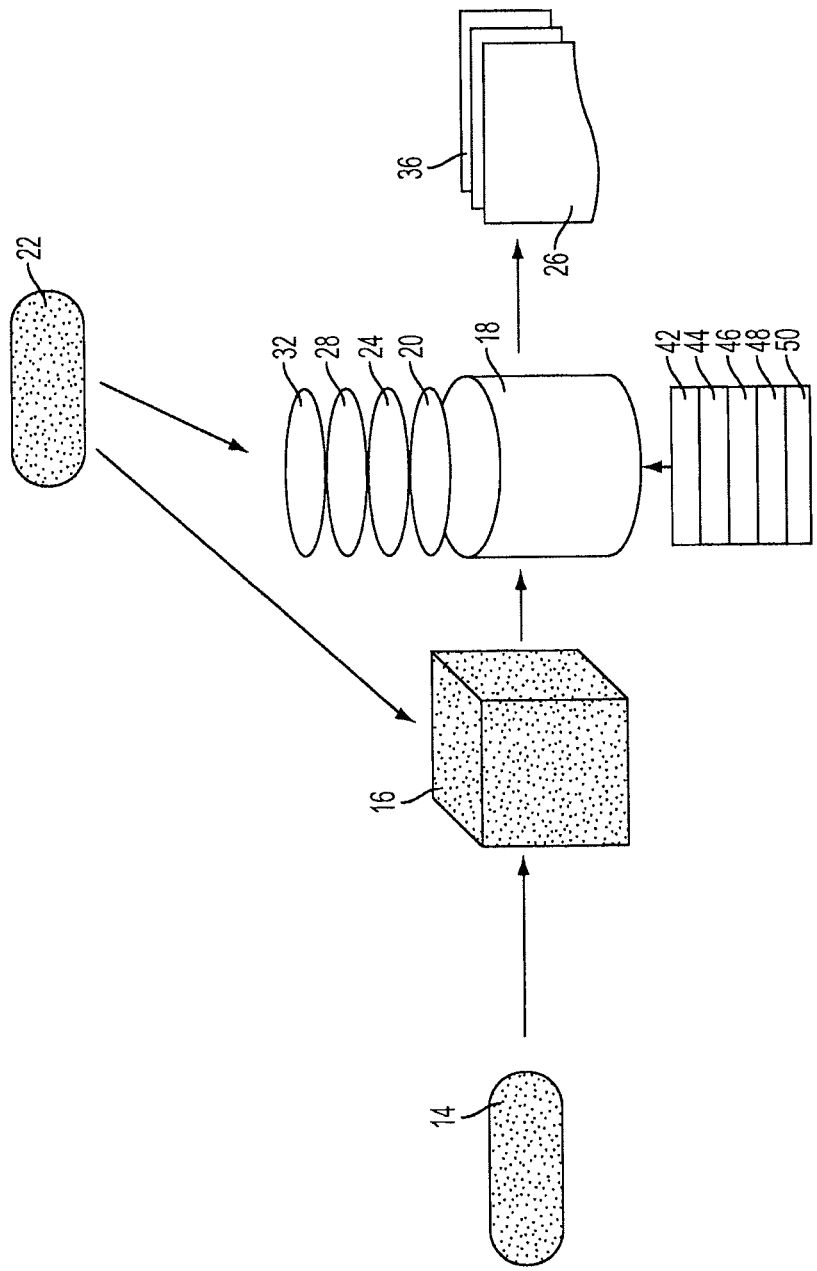
FIG. 9 shows the real time continuous system which is applied to any data input and includes an interface.
Figure 10:
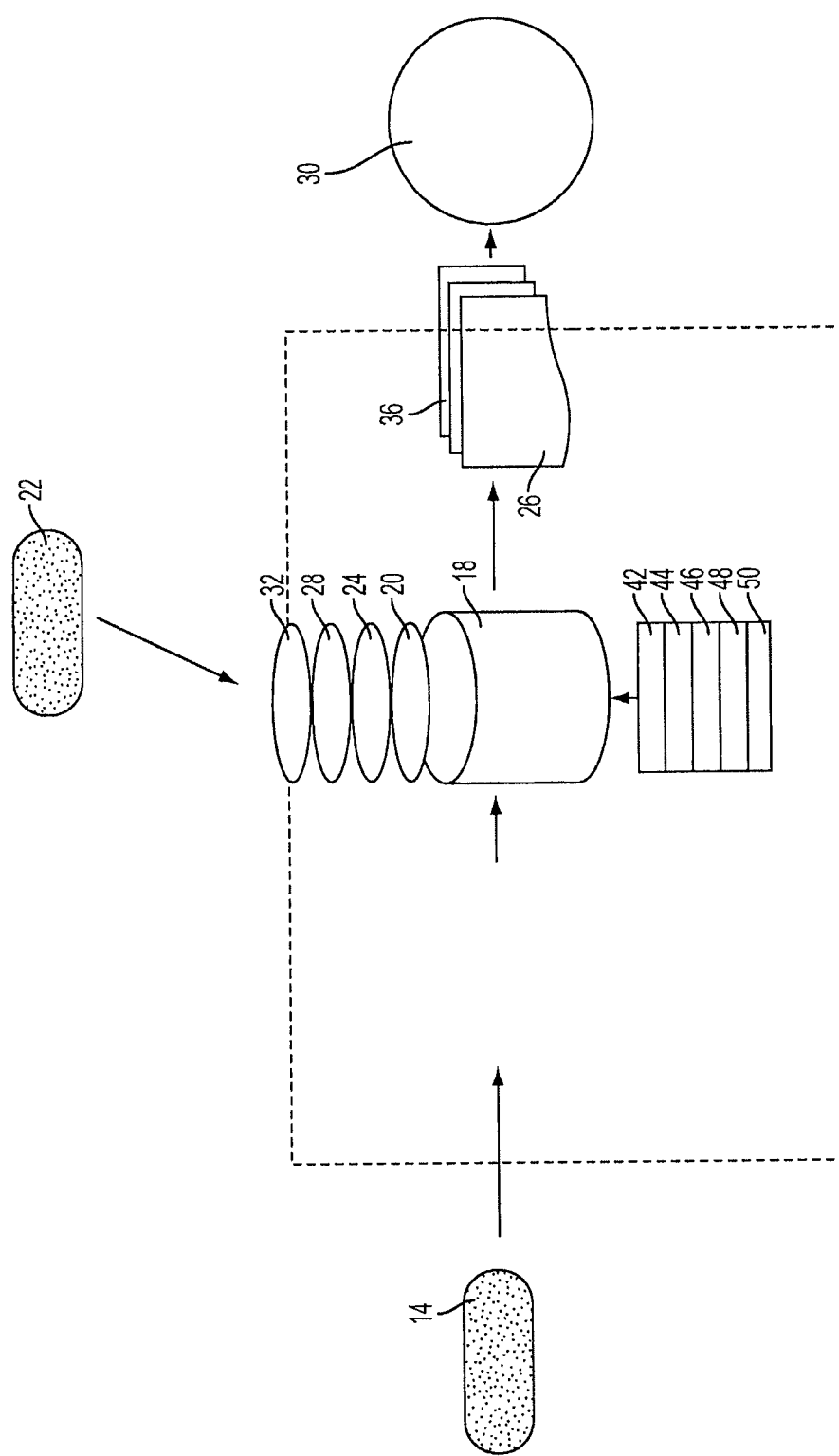
FIG. 10 shows the real time continuous system which is applied to any data input and includes the World Wide Web.
Figure 11:
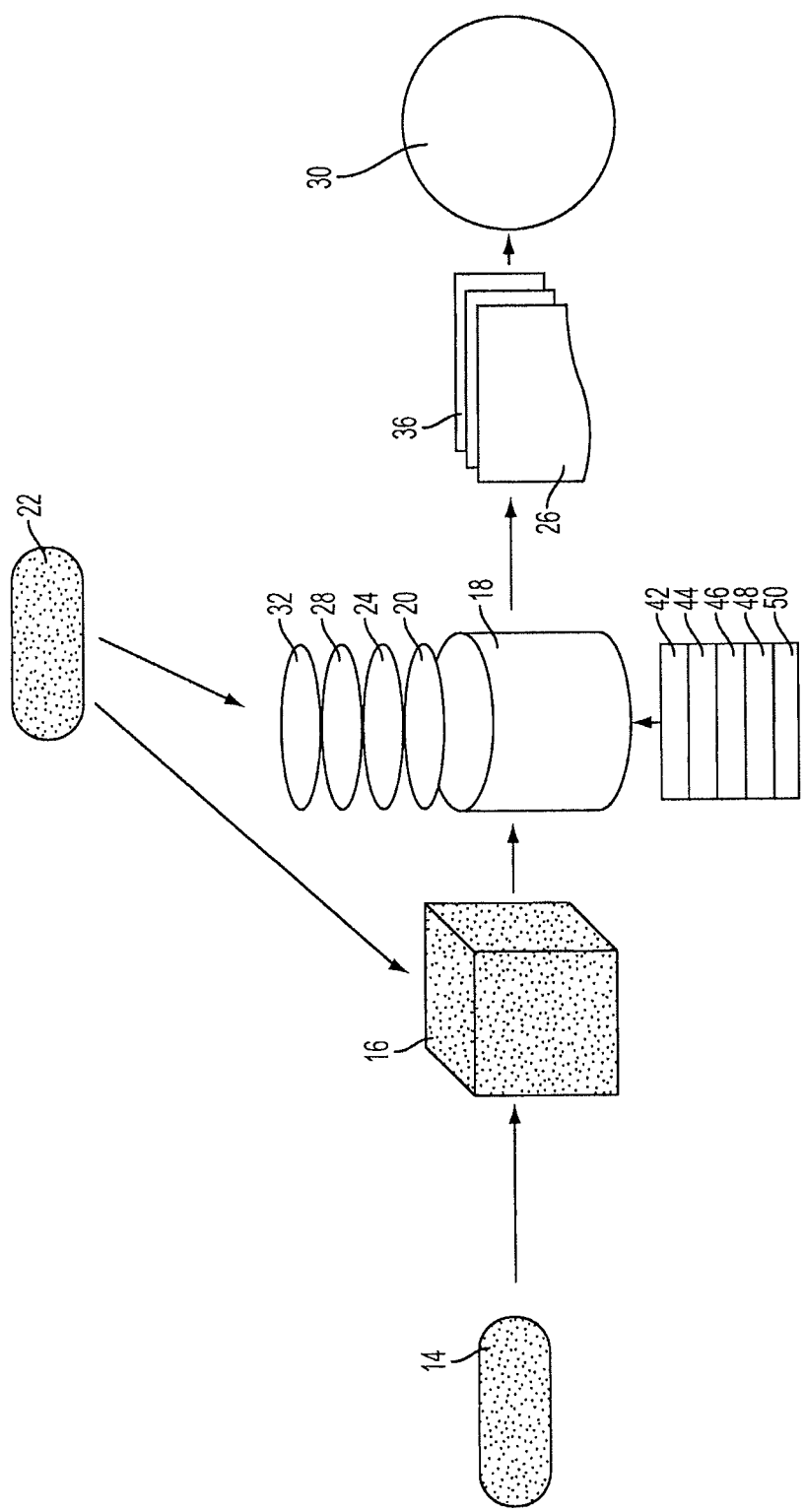
FIG. 11 shows the real time continuous system which is applied to any data input and includes an interface and World Wide Web.
Figure 12:
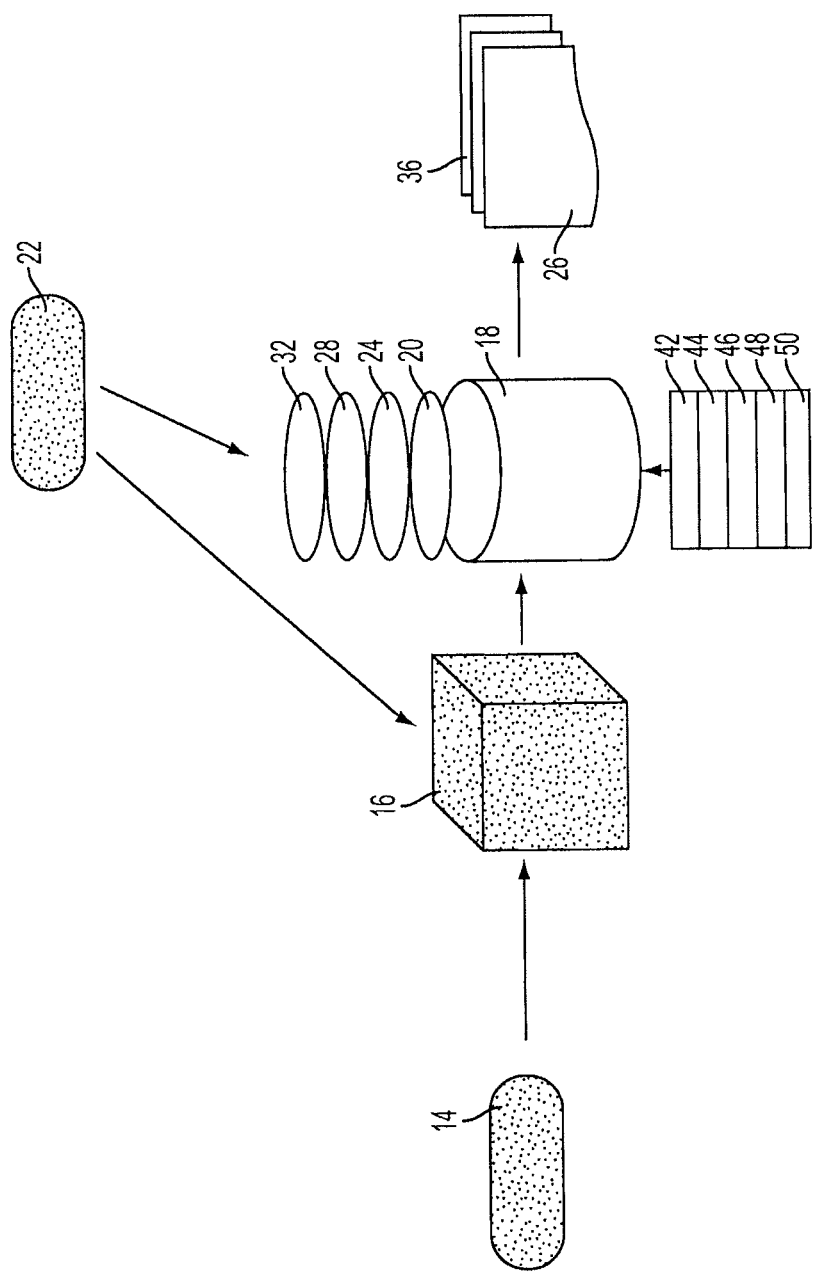
FIG. 12 shows the real time continuous system which is designed for investment portfolios and includes an interface.

Additional embodiments of my system are shown in FIGS. 4-12. In FIG. 4 the system is designed for investment portfolios and is manual; in FIG. 5 the system is designed for investment portfolios, is manual and includes an interface; in FIG. 6, the system is designed for investment portfolios, is manual and includes an interface and World Wide Web; in FIG. 7, system is designed for investment portfolios, is manual and includes the World Wide Web; in FIG. 8 the system is real time continuous and can be applied to any data input; in FIG. 9 the system is real time continuous and can be applied to any data input and includes an interface; in FIG. 10 the system is real time continuous and can be applied to any data input and includes the World Wide Web; in FIG. 11 the system is real time continuous and can be applied to any data input and includes an interface and World Wide Web; and FIG. 12 the system is real time continuous and can be applied to any data input and is designed for investment portfolios and includes an interface.

Accordingly, one of skill in the art will see that my system provides for a highly reliable, thorough and attentive system in determining and displaying when portfolios fall outside predetermined boundaries, thus enabling investors to know when they get off track in meeting investment goals, or when an investment manager deviates from the decision making model, or both.

Additionally, my system provides for input, output, and use of information heretofore not continuously used in the process and allows the user to continuously assess trends in the impact of portfolio activities or fluctuations in prices in world financial markets, or both, on the investment portfolio. It also provides for immediate awareness of when and how to fine-tune the investment management process before it is too late to minimize losses.

Furthermore, my system has the additional advantages in that a) it provides for more economical business operating models and b) it provides for worldwide application, benefiting mankind and c) it provides for significant timesavings and d) it provides for a more convenient and easier way to monitor and scan investment portfolios and compatibility with existing data and analytical process and tools and e) it provides for acceleration of the portfolio rebalance or reallocation decision, or both and awareness of shortfall risk and f) it provides for a consistent approach to investment manager evaluation and selection and replacement and g) it provides for greater tax efficiency.

While my above description contains many specificities, these should not be construed as limitations on the scope of the invention, but rather as an exemplification of one preferred embodiment thereof. Many other variations are possible. For example, a system for portfolios, the system for portfolios and an interface, the system for portfolios and an interface and World Wide Web for distributing results, the system for portfolios and World Wide Web for distributing results, system for continuous real time capability for portfolios, the system for continuous real time portfolios and an interface, the system for continuous real time portfolios and an interface and World Wide Web for distribution of results, the system for continuous real time portfolios and World Wide Web for distribution of results.

Accordingly, the scope of my system should be determined not by the embodiment(s) described, but by the appended claims and their legal equivalents.

What is claimed is:

1. A system for real time continuous analysis of investment portfolios, comprising:
    an input unit for continuously receiving a plurality of data inputs from a plurality of information sources and data of one or more groups of investment portfolios, wherein the one or more groups of investment portfolios each include at least one portfolio of an investor,
    a database for storing the received data inputs,
    a processor for automatically and continuously determining a number of exceptions to each of a plurality of predetermined guidelines have occurred in any investment portfolio group as compared to at least one other investment portfolio group and outputting an alert in response to the number of exceptions to each of the plurality of predetermined guidelines exceeding predetermined boundaries, the guidelines comprising user defined parameters unrelated to a performance benchmark, and
    a storage unit for storing the alert.

2. A system for analyzing investment portfolios, comprising:
    an input unit for receiving a plurality of data inputs from a plurality of information sources and data of one or more groups of investment portfolios, wherein the one ore more groups of investment portfolios include at least one portfolio of an investor,
    a database for storing the received data inputs,
    a processor for automatically determining a number of exceptions to each of a plurality of predetermined guidelines have occurred in any investment portfolio group as compared to at least one other investment portfolio group and outputting an alert in response to the number of exceptions to each of the plurality of predetermined guidelines exceeding predetermined boundaries, the guidelines comprising user defined parameters unrelated to a performance benchmark, and
    a storage unit for storing the alert.

3. The system according to claim 1, wherein the predetermined guidelines include at least one of short term gains and losses, long term gains and losses, limitation on any special groupings, limitation on any security attribute or combination, limitations on transaction costs, limitations on any transaction frequency, limitations on any transaction size, limitations on any transaction type, limitations on a transaction period, limitations on a holding period, tracking error, risk, portfolio turnover, investment philosophy, a decision making model, performance attribution, changes in sources of return or loss and portfolio return.

4. The system according to claim 2, wherein the predetermined guidelines include at least one of short term gains and losses, long term gains and losses, limitation on any special groupings, limitation on any security attribute or combination, limitations on transaction costs, limitations on any transaction frequency, limitations on any transaction size, limitations on any transaction type, limitations on a transaction period, limitations on a holding period, tracking error, risk, portfolio turnover, investment philosophy, a decision making model, performance attribution, changes in sources of return or loss and portfolio return.

5. The system according to claim 1, wherein the plurality of information sources include at least one of investment managers, custodians of securities, transfer agents and data vendors.

6. The system according to claim 1, wherein the plurality of data inputs comprise at least one of real time financial markets data, security data, portfolio data, trade data, position data, quantity data and account data.

7. The system according to claim 2, wherein the plurality of information sources include at least one of investment managers, custodians of securities, transfer agents and data vendors.

8. The system according to claim 2, wherein the plurality of data inputs comprise at least one of financial markets data, security data, portfolio data, trade data, position data, quantity data and account data.

9. The system of claim 1, further comprising a display to display at least one exception to the plurality of predetermined guidelines.

10. The system of claim 2, further comprising a display to display at least one exception to the plurality of predetermined guidelines.

11. The system of claim 1, wherein the system operates over the Internet.

12. The system of claim 2, wherein the system operates over the Internet.

13. The system of claim 1, wherein a further alert is output if a predetermined configuration of alerts are output.

14. The system of claim 2, wherein a further alert is output if a predetermined configuration of alerts are output.

15. The system of claim 13, wherein the further alert is displayed by a display.

16. The system of claim 14, wherein the further alert is displayed by a display.

17. The system of claim 1, wherein the processor connects to the plurality of information sources.

18. The system of claim 2, wherein the processor connects to the plurality of information sources.

19. The system of claim 16, wherein the processor connects to the plurality of information sources via a world wide web.

20. The system of claim 17, wherein the processor connects to the plurality of information sources via a world wide web.

21. A system for real time continuous analysis of investment portfolios, comprising:
    an input unit for continuously receiving a plurality of data inputs from a plurality of information sources and data of one or more groups of investment portfolios, wherein the one or more groups of investment portfolios each include at least one portfolio of an investor,
    a database for storing the received data inputs,
    a processor for continuously determining whether at least one exception to a predetermined guideline has occurred in any investment portfolio group as compared to at least one other investment portfolio group and outputting an alert if at least one exception has occurred indicating a boundary limitation on special groupings has been exceeded, the guidelines comprising user defined parameters unrelated to a performance benchmark, and
    a storage unit for storing the alert.

22. A system for real time continuous analysis of investment portfolios, comprising:
    an input unit for continuously receiving a plurality of data inputs from a plurality of information sources and data of one or more groups of investment portfolios, wherein the one or more groups of investment portfolios each include at least one portfolio of an investor,
    a database for storing the received data inputs,
    a processor for continuously determining whether at least one exception to each of a plurality of predetermined guidelines has occurred in any investment portfolio group as compared to at least one other investment portfolio group and outputting an alert in response to at least one exception to each of the plurality of predetermined guidelines exceeding predetermined boundaries, the guidelines comprising user defined parameters unrelated to a performance benchmark, and a storage unit for storing the alert.

23. A system for real time continuous analysis of investment portfolios, comprising:

an input unit for continuously receiving a plurality of data inputs from a plurality of information sources and data of one or more groups of investment portfolios, wherein the one or more groups of investment portfolios each include at least one portfolio of an investor, a database for storing the received data inputs, a processor for automatically determining whether at least one exception to each of a plurality of predetermined guidelines has occurred in any investment portfolio group as compared to at least one other investment portfolio group and outputting an alert in response to at least one exception to each of the plurality of predetermined guidelines exceeding predetermined boundaries, the guidelines comprising user defined parameters unrelated to a performance benchmark, and a storage unit for storing the alert.

24. A system for real time continuous analysis of investment portfolios, comprising:

an input unit for continuously receiving a plurality of data inputs from a plurality of information sources and data of one or more groups of investment portfolios, wherein the one or more groups of investment portfolios each include at least one portfolio of an investor, a database for storing the received data inputs, a processor for automatically and continuously determining whether at least one exception to each of a plurality of predetermined guidelines has occurred in any investment portfolio group as compared to at least one other investment portfolio group and outputting an alert in response to at least one exception to each of the plurality of predetermined guidelines exceeding predetermined boundaries, the guidelines comprising user defined parameters unrelated to a performance benchmark, and a storage unit for storing the alert.

* * * * *